United States Patent
Ko et al.

(10) Patent No.: US 10,926,770 B2
(45) Date of Patent: Feb. 23, 2021

(54) METHOD OF CONTROLLING DUAL CLUTCH TRANSMISSION AND SYSTEM THEREOF

(71) Applicants: Hyundai Motor Company, Seoul (KR); Kia Motors Corporation, Seoul (KR)

(72) Inventors: Young Ho Ko, Yongin-Si (KR); Ho Young Lee, Bucheon-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/664,011

(22) Filed: Oct. 25, 2019

(65) Prior Publication Data

US 2020/0346651 A1 Nov. 5, 2020

(30) Foreign Application Priority Data

Apr. 30, 2019 (KR) ........................ 10-2019-0050232

(51) Int. Cl.
*B60W 10/02* (2006.01)
*B60W 10/113* (2012.01)
*B60W 30/19* (2012.01)

(52) U.S. Cl.
CPC .......... *B60W 30/19* (2013.01); *B60W 10/023* (2013.01); *B60W 10/113* (2013.01);
(Continued)

(58) Field of Classification Search
CPC .. B60W 10/02; B60W 10/023; B60W 10/113; B60W 30/19; B60W 2520/10; B60W 2710/025; B60W 2710/026; B60W 2710/027; B60W 2710/1011; B60W 2710/1016; F16D 48/08; F16D 48/10;
(Continued)

(56) References Cited

U.S. PATENT DOCUMENTS

| 8,392,083 | B2 | 3/2013 | Hodrus et al. |
| 9,989,110 | B2 * | 6/2018 | Kim ........................ F16D 48/06 |

(Continued)

FOREIGN PATENT DOCUMENTS

| JP | 2015-513052 A | 4/2015 |
| KR | 10-1449143 B1 | 10/2014 |

(Continued)

*Primary Examiner* — Edwin A Young
(74) *Attorney, Agent, or Firm* — Morgan, Lewis & Bockius LLP (57) ABSTRACT

A method of controlling a dual clutch transmission, may include releasing a pressure of a non-driveshaft clutch and engaging a gear of a non-driveshaft; applying a first pressure to the non-driveshaft clutch and disengaging the gear of the non-driveshaft; determining a drag torque on the basis of a first rotation speed change rate of the non-driveshaft; releasing the first pressure and engaging the gear of the non-driveshaft; applying a second pressure to the non-driveshaft clutch and disengaging the gear of the non-driveshaft; determining a touch point torque on the basis of a second rotation speed change rate of the non-driveshaft; and adjusting a touch point of the non-driveshaft clutch on the basis of a net torque which is a difference between the touch point torque and the drag torque.

18 Claims, 6 Drawing Sheets

(52) U.S. Cl.
CPC . *B60W 2510/02* (2013.01); *B60W 2510/0275* (2013.01); *B60W 2510/102* (2013.01); *B60W 2510/1015* (2013.01); *B60W 2520/10* (2013.01); *B60W 2710/021* (2013.01); *B60W 2710/1005* (2013.01); *B60Y 2300/19* (2013.01)

(58) Field of Classification Search
CPC ... F16D 2500/3108; F16D 2500/50251; F16D 2500/5026; F16D 2500/50266; F16D 2500/50269; F16D 2500/50272; F16D 2500/50275; F16D 2500/50281
See application file for complete search history.

(56) References Cited

U.S. PATENT DOCUMENTS

| | | | |
|---|---|---|---|
| 2014/0136066 A1* | 5/2014 | Cho | F16D 48/06 701/68 |
| 2016/0138664 A1* | 5/2016 | Lee | F16D 48/00 701/67 |
| 2017/0234376 A1* | 8/2017 | Cho | F16D 48/08 701/67 |

FOREIGN PATENT DOCUMENTS

| | | |
|---|---|---|
| KR | 10-1601707 B1 | 3/2016 |
| KR | 10-2017-0078741 A | 7/2017 |

* cited by examiner

METHOD OF CONTROLLING DUAL CLUTCH TRANSMISSION AND SYSTEM THEREOF

CROSS-REFERENCE TO RELATED APPLICATION

The present application claims priority to Korean Patent Application No. 10-2019-0050232, filed on Apr. 30, 2019, the entire contents of which is incorporated herein for all purposes by this reference.

BACKGROUND OF THE INVENTION

Field of the Invention

The present invention relates to a method of controlling a dual clutch transmission and a system thereof.

Description of Related Art

In the case of a dry clutch used for an automatic manual transmission, a transfer torque characteristic and a touch point of the dry clutch are predicted through a micro slip control in which a clutch characteristic curve (Torque-Stroke Curve: T-S curve) is predicted in real time through a transfer torque map of the dry clutch.

A touch point is an important factor for the clutch, and when the touch point is not identified, deterioration of drivability accompanied by oscillation and shock occurs. Since the touch point changes with temperature, centrifugal force, and the like, there is a need to identify the touch point in a system.

Such a dry clutch has a technical limitation that in a state in which an actual torque applied to the clutch is unable to be measured, the clutch characteristic curve needs to be predicted without any sensor.

On the other hand, since a wet clutch is provided with a hydraulic sensor configured for detecting the hydraulic pressure transferred from a valve body to a clutch surface of the wet clutch, the hydraulic pressure on the clutch surface is identified, and the clutch torque is accordingly identified, so that the transfer torque characteristics of the clutch may be identified in an accurate state.

Meanwhile, according to the conventional technology, in a state in which a gear is not engaged with a non-driveshaft, learning on a touch point is performed. However, during travel of a vehicle, a non-driveshaft while free-wheeling may have a rotation speed synchronized with the rotation speed of the engine without being lowered, due to a drag characteristic of the clutch. In the instant case, the conventional technology has difficulty in learning the touch point.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a method of controlling a dual clutch transmission and a system thereof, that are configured for accurately learning a touch point of a clutch in consideration of the drag characteristic of a wet clutch, and reflecting the touch point on the gear shift.

Additional aspects of the present invention will be set forth in portion in the description which follows and, in part, will be obvious from the description, or may be learned by practice of the present invention.

In accordance with one aspect of the present invention, a method of controlling a dual clutch transmission include: releasing a pressure of a non-driveshaft clutch and engaging a gear of a non-driveshaft; applying a first pressure to the non-driveshaft clutch and disengaging the gear of the non-driveshaft; determining a drag torque on the basis of a first rotation speed change rate of the non-driveshaft; releasing the first pressure and engaging the gear of the non-driveshaft; applying a second pressure to the non-driveshaft clutch and disengaging the gear of the non-driveshaft; determining a touch point torque on the basis of a second rotation speed change rate of the non-driveshaft; and adjusting a touch point of the non-driveshaft clutch on the basis of a net torque which is a difference between the touch point torque and the drag torque.

The method may further include: detecting a traveling speed of a vehicle, wherein the releasing of the pressure of the non-driveshaft clutch and engaging of the gear of the non-driveshaft may be performed upon determining that the traveling speed of the vehicle is kept constant.

The determining of the drag torque on the basis of the first rotation speed change rate of the non-driveshaft may include: determining a first slip time of the non-driveshaft; and determining the first rotation speed change rate on the basis of a change value of a rotation speed of the non-driveshaft during the first slip time.

The determining of the first slip time of the non-driveshaft may include: setting a slip starting time point using a difference between the rotation speed of the non-driveshaft and a predetermined virtual rotation speed; setting a slip ending time point using a difference between a rotation speed of an engine and the rotation speed of the non-driveshaft; and determining a difference between the slip starting time point and the slip ending time point as the first slip time.

The determining of the touch point torque on the basis of the second rotation speed change rate of the non-driveshaft may include: determining a second slip time of the non-driveshaft; and determining the second rotation speed change rate on the basis of a change value of a rotation speed of the non-driveshaft during the second slip time.

The determining of the second slip time of the non-driveshaft may include: setting a slip starting time point using a difference between the rotation speed of the non-driveshaft and a predetermined virtual rotation speed; setting a slip ending time point using a difference between a rotation speed of an engine and the rotation speed of the non-driveshaft; and determining a difference between the slip starting time point and the slip ending time point as the second slip time.

The adjusting of the touch point of the non-driveshaft clutch on the basis of the net torque may include: determining, upon determining that the net torque is greater than or equal to a predetermined reference torque, a compensation pressure value on the basis of a difference between the net torque and the reference torque; and adjusting a pressure value obtained by reducing the second pressure by the compensation pressure value, as the touch point of the non-driveshaft clutch.

The adjusting of the touch point of the non-driveshaft clutch on the basis of the net torque may include: determining, upon determining that the net torque is less than a predetermined reference torque, a compensation pressure value on the basis of a difference between the net torque and the reference torque; and adjusting a pressure value obtained by increasing the second pressure by the compensation pressure value, as the touch point of the non-driveshaft clutch.

The method may further include performing a gear shift on the basis of the adjusted touch point.

In accordance with another aspect of the present invention, a system for controlling a dual clutch transmission includes: a dual clutch module including a driveshaft clutch selectively connecting an engine to a driveshaft, a non-driveshaft clutch selectively connecting the engine to a non-driveshaft, a driveshaft clutch actuator, and a non-driveshaft clutch actuator; an input shaft rotation speed sensor configured to measure a rotation speed of the driveshaft and a rotation speed of the non-driveshaft; a clutch pressure sensor configured to measure a pressure applied to the driveshaft clutch and a pressure applied to the non-driveshaft; and a control unit including a processor and a memory, wherein the control unit is configured to: release a pressure of the non-driveshaft clutch and engage a gear of the non-driveshaft; apply a first pressure to the non-driveshaft clutch and disengage the gear of the non-driveshaft; determine a drag torque on the basis of a first rotation speed change rate of the non-driveshaft; release the first pressure and engage the gear of the non-driveshaft; apply a second pressure to the non-driveshaft clutch and disengage the gear of the non-driveshaft; determine a touch point torque on the basis of a second rotation speed change rate of the non-driveshaft; and adjust a touch point of the non-driveshaft clutch on the basis of a net torque which is a difference between the touch point torque and the drag torque.

The system may further include a vehicle speed sensor configured to detect a traveling speed of a vehicle, wherein the control unit may release the pressure of the non-driveshaft clutch and engage the gear of the non-driveshaft when the traveling speed of the vehicle is kept constant.

The control unit may be configured to: determine a first slip time of the non-driveshaft; and determine the first rotation speed change rate on the basis of a change value of a rotation speed of the non-driveshaft during the first slip time.

The control unit may be configured to: set a slip starting time point using a difference between the rotation speed of the non-driveshaft and a predetermined virtual rotation speed; set a slip ending time point using a difference between a rotation speed of the engine and the rotation speed of the non-driveshaft; and determine a difference between the slip starting time point and the slip ending time point as the first slip time.

The control unit may be configured to: determine a second slip time of the non-driveshaft; and determine the second rotation speed change rate on the basis of a change value of a rotation speed of the non-driveshaft during the second slip time.

The control unit may be configured to: set a slip starting time point using a difference between the rotation speed of the non-driveshaft and a predetermined virtual rotation speed; set a slip ending time point using a difference between a rotation speed of the engine and the rotation speed of the non-driveshaft; and determine a difference between the slip starting time point and the slip ending time point as the second slip time.

The control unit may be configured to: determine, upon determining that the net torque is greater than or equal to a predetermined reference torque, a compensation pressure value on the basis of a difference between the net torque and the reference torque; and adjust a pressure value obtained by reducing the second pressure by the compensation pressure value, as the touch point of the non-driveshaft clutch.

The control unit may be configured to: determine, upon determining that the net torque is less than a predetermined reference torque, a compensation pressure value on the basis of a difference between the net torque and the reference torque; and adjust a pressure value obtained by increasing the second pressure by the compensation pressure value, as the touch point of the non-driveshaft clutch.

The control unit may perform a gear shift on the basis of the adjusted touch point.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Like numerals refer to like elements throughout the specification. Not all elements of embodiments of the present invention will be described, and description of what are commonly known in the art or what overlap each other in the exemplary embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in the exemplary embodiment, specify the presence of stated features, integers, steps, operations, elements, and/or components, but do not preclude the presence or addition of one or more other features, integers, steps, operations, elements, components, and/or groups thereof, unless the context clearly indicates otherwise.

As used herein, the singular forms "a," "an" and "the" are intended to include the plural forms as well, unless the context clearly indicates otherwise.

The terms, such as "~part", "~device", "~block", "~member", "~module", and the like may refer to a unit of processing at least one function or act. For example, the terms may refer to an electrical circuit, at least one hardware, at least one software stored in a memory, or at least one process processed by a processor.

Reference numerals used for method operations are just used to distinguish each operation, but not to limit an order of the operations. Thus, unless the context clearly dictates otherwise, the written order may be practiced otherwise.

Hereinafter, embodiments will be described in detail with reference to the accompanying drawings.

Figure 1:
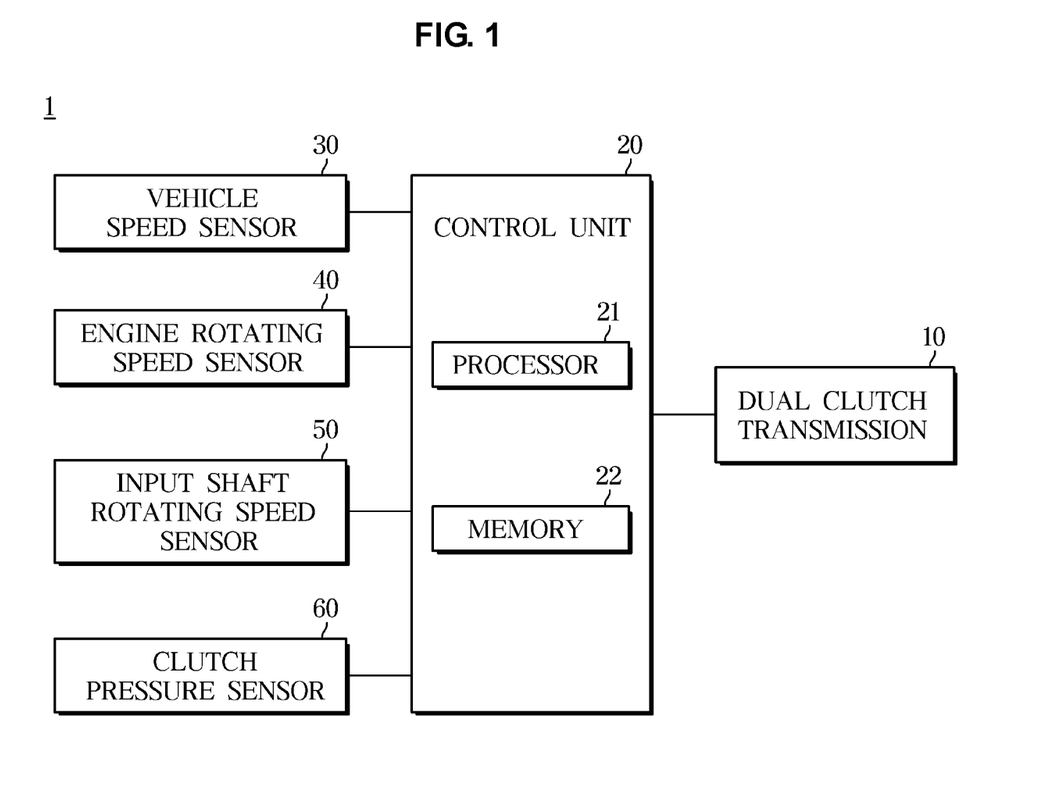
FIG. 1 is a diagram illustrating a configuration of a system for controlling a dual clutch transmission according to an exemplary embodiment of the present invention.
Figure 2:
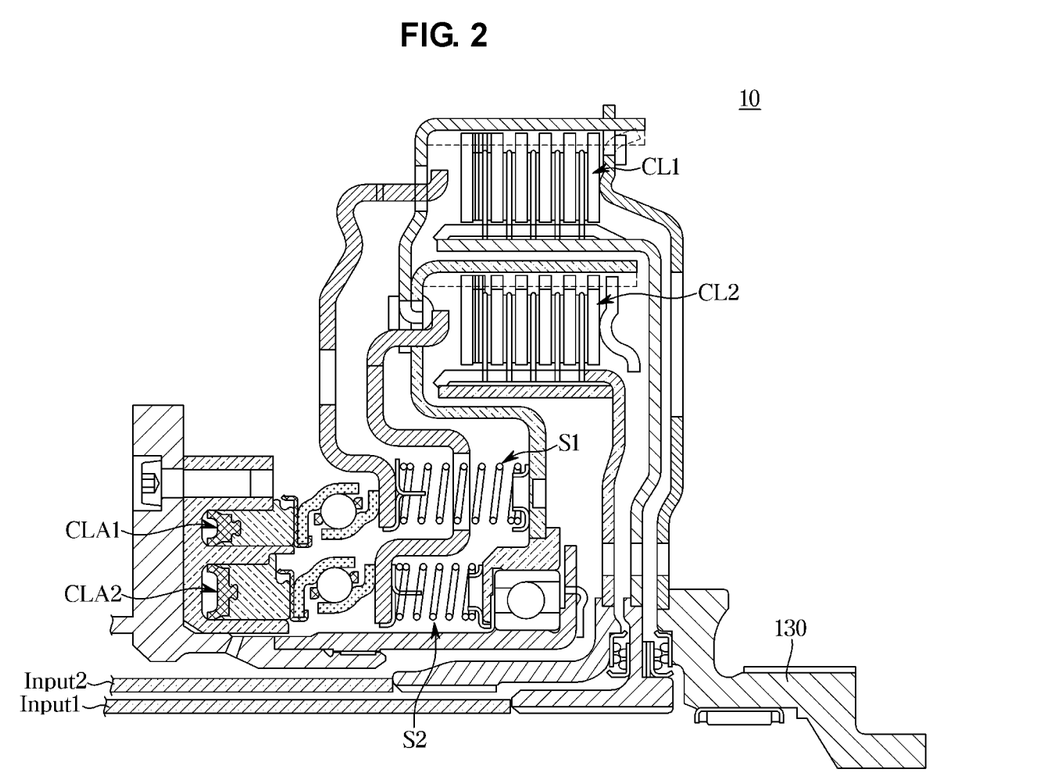
FIG. 2 is a cross-sectional view exemplarily illustrating a dual clutch module included in the dual clutch transmission.

FIG. 1 is a diagram illustrating a configuration of a system 1 for controlling a dual clutch transmission according to an exemplary embodiment of the present invention, and FIG. 2 is a cross-sectional view exemplarily illustrating a dual clutch module included in the dual clutch transmission.

Referring to FIG. 1, the system 1 for controlling the dual clutch transmission includes a dual clutch transmission 10, a control unit 20, a vehicle speed sensor 30, an engine rotation speed sensor 40, an input shaft rotation speed sensor 50, and a clutch pressure sensor 60. The vehicle speed sensor 30 may detect the traveling speed of a vehicle. The engine rotation speed sensor 40 may detect the rotation speed of an output shaft of an engine.

Referring to FIG. 2, the dual clutch transmission 10 includes an input hub 130 for transmitting power, torque, and rotational force generated by the engine to one of a first clutch CL1 and a second clutch CL2. The input hub 130 rotates in connection with the output shaft of the engine.

The dual clutch transmission 10 includes a wet dual-clutch. The first clutch CL1 may be provided to be connected to a first input shaft Input 1 including an odd-number gear, and a second clutch CL2 may be provided to be connected to a second input shaft Input 2 including an even-number gear. The first input shaft Input 1 and the second input shaft Input 2 may be mounted on the same axis line.

The first clutch CL1 and the second clutch CL2 are implemented using a multi-disk clutch. That is, the first clutch CL1 and the second clutch CL2 each include a plurality of flanges and a plurality of friction disks. Furthermore, the first clutch CL1 and the second clutch CL2 include lubricating oil. The lubricating oil cools the friction disk and protect the clutches CL1 and CL2.

A first clutch actuator CLA1 and a second clutch actuator CLA2 may be implemented using hydraulic rams. The plurality of friction disks included in the first clutch CL1 may be compressed by an operation of the first clutch actuator CLA1, so that the first clutch CL1 rotates the first input shaft Input 1. Similarly, the second clutch CL2 may be compressed by an operation of the second clutch actuator CLA2, so that the second clutch CL2 rotates the second input shaft Input 2.

The first clutch actuator CLA1 and the second clutch actuator CLA2 may be controlled by the control unit 20. The control unit 20 may control hydraulic pressures of the first clutch actuator CLA1 and the second clutch actuator CLA2. Furthermore, the first clutch actuator CLA1 and the second clutch actuator CLA2 may include a clutch pressure sensor 60. The clutch pressure sensor 60 may detect the hydraulic pressure applied to each of the first clutch actuator CLA1 and the second clutch actuator CLA2.

When the first input shaft Input 1 is rotated by the first clutch CL1, a pressure is not applied to the second clutch CL2, so that a rotational force generated by the engine is transmitted to the second input shaft Input 2. When a clutch pressure is not applied to the second clutch CL2, the second clutch CL2 may maintain a clearance by a second spring S2. That is, the friction disks included in the second clutch CL2 are spaced from each other. Similarly, when a clutch pressure is not applied to the first clutch CL1, the first clutch CL1 may maintain a clearance by a first spring S1.

The input shaft rotation speed sensor 50 is provided on each of the first input shaft Input 1 and the second input shaft Input 2 to detect the rotation speed of the first input shaft Input 1 and the rotation speed of the second input shaft Input 2.

The control unit 20 may include at least one processor 21 for executing a program related to the operation of the system 1 for controlling the dual clutch transmission and at least one memory 22 in which the program is stored. The memory 22 and the processor 21 included in the control unit 20 may be integrated in a single chip or may be physically separated from each other.

The memory 22 may include a nonvolatile memory device, such as a cache, a read only memory (ROM), a programmable ROM (PROM), an erasable programmable ROM (EPROM), an electrically erasable programmable ROM (EEPROM), and a flash memory, a volatile memory device, such as a random access memory (RAM), or other storage media, such as a hard disk drive (HDD), a CD-ROM, and the like, to store various programs, data and/or information therein.

Figure 3:
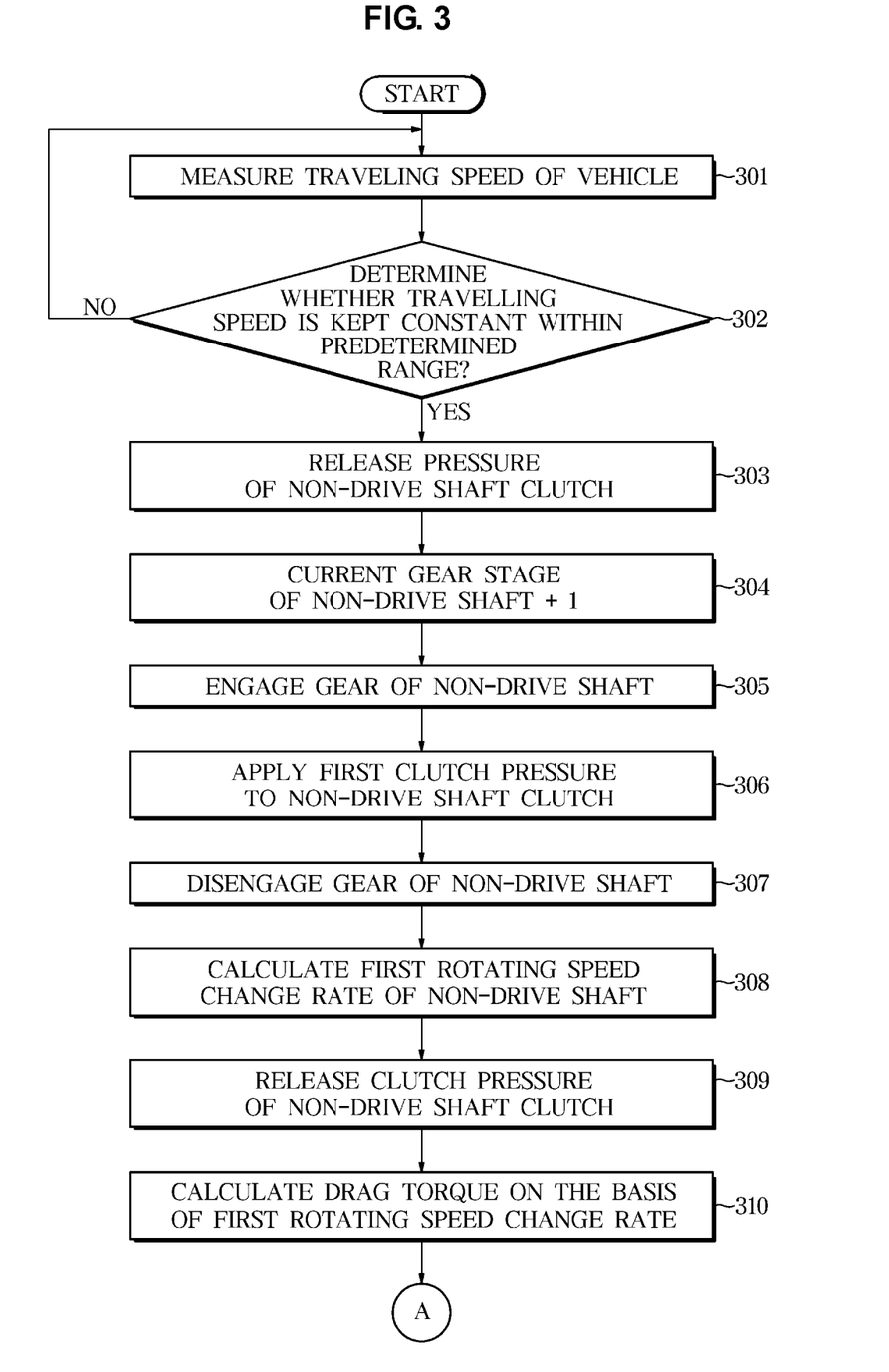
FIG. 3 and FIG. 4 are flowcharts for describing a method of controlling a dual clutch transmission according to an exemplary embodiment of the present invention.
Figure 4:
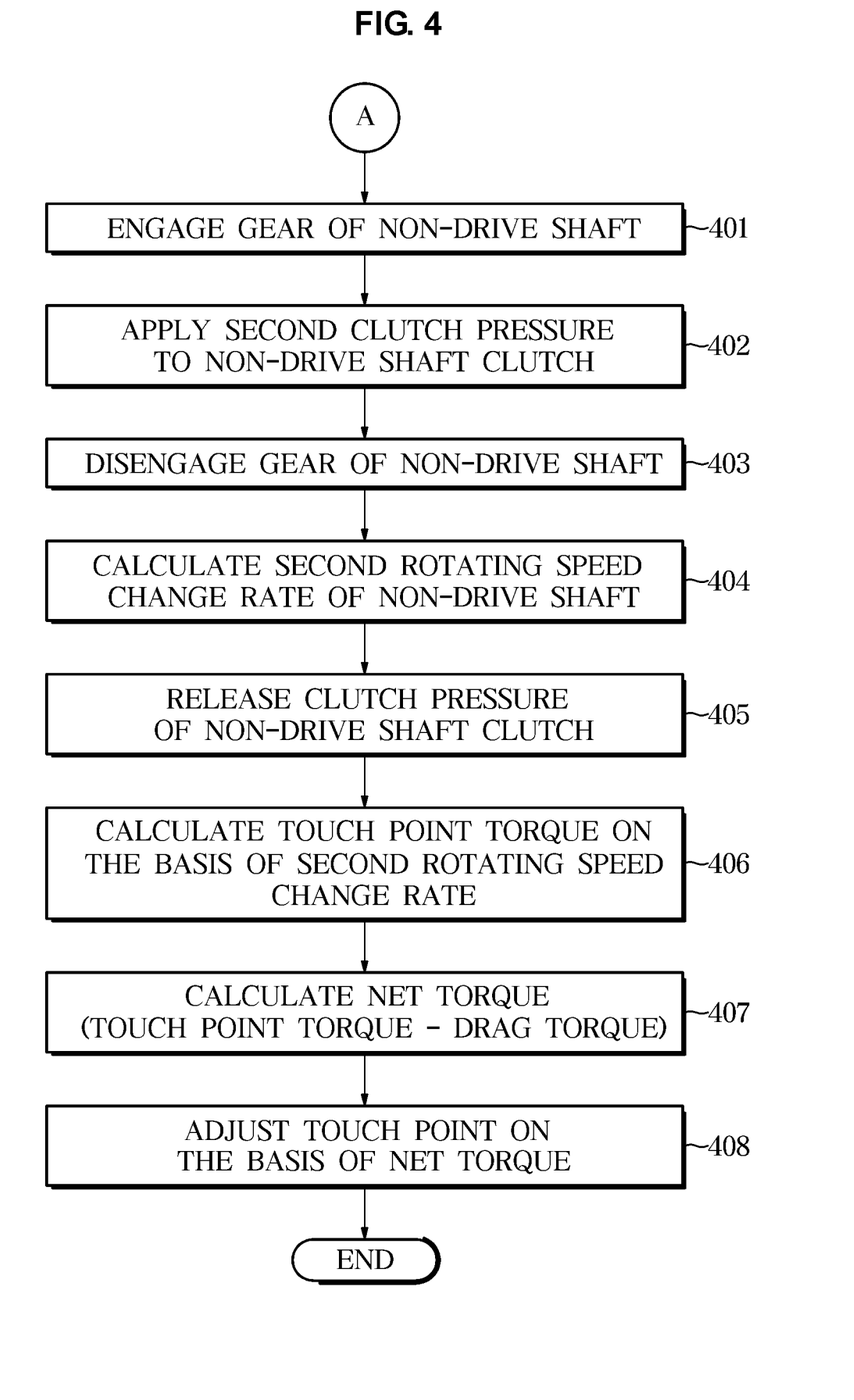

FIG. 3 and FIG. 4 are flowcharts for describing a method of controlling a dual clutch transmission according to an exemplary embodiment of the present invention.

For the convenience of description, the first input shaft Input 1 is referred to as a driveshaft, the first clutch CL1 is referred to as a driveshaft clutch, the second input shaft Input 2 is referred to as a non-driveshaft, the second clutch CL2 is referred to as a non-driveshaft clutch, the first clutch actuator CLA1 is referred to as a driveshaft clutch actuator, and the second clutch actuator CLA2 is referred to as a non-driveshaft clutch actuator.

In an ideal case, the non-driveshaft Input 2, freewheeling is subjected to reduction of rotation speed due to a clearance of the non-driveshaft clutch CL2. However, in the case of a wet dual clutch transmission 10, fluid friction occurs due to the lubricating oil included in the clutches CL1 and CL2, which causes the non-driveshaft Input 2 to rotate together with the driveshaft Input 1. That is, the non-driveshaft Input 2 may receive a torque in a direction to be synchronized with the rotation speed of the engine. Such a torque is referred to as a drag torque.

Due to such drag torque, the non-driveshaft Input 2 may rotate in a direction that follows the rotation speed of the engine even when the gear of the non-driveshaft Input 2 is disengaged. In the instant case, a touch point corresponding to a clutch pressure applied to the non-driveshaft clutch CL2 is not accurately learned. Accordingly, there is a demand for a technique accurately learning the touch point even in the presence of a drag torque.

The system 1 for controlling the dual clutch transmission according to the exemplary embodiment may adjust a touch point of the non-driveshaft clutch CL2 and perform accurate learning of the touch point.

Referring to FIG. 3, the control unit 20 controls the vehicle speed sensor 30 to measure the traveling speed of the vehicle (301). The learning of a touch point of the non-driveshaft clutch CL2 is performed when the vehicle is traveling at a constant speed. When the vehicle accelerates with an increasing travel speed, gear shift is performed and switch between a driveshaft and a non-driveshaft occurs, so that the learning of a touch point is not performed.

The control unit 20 determines whether the traveling speed of the vehicle is kept constant (302), and when the traveling speed of the vehicle is kept constant, releases the pressure of the non-driveshaft clutch CL2 (303). The releasing of the clutch pressure may represent that the pressure applied to the clutch is zero.

Thereafter, the control unit 20 engages the gear of the non-driveshaft Input2. In the instant case, the control unit 20 may increase the gear stage of the non-driveshaft Input2 by one stage and then engage the gear of the non-driveshaft Input2 (304 and 305). For example, when the gear of the non-driveshaft Input2 is currently in the second stage, the control unit 20 may engage the gear into the third stage.

The control unit 20 may apply a first pressure to the non-driveshaft clutch CL2 and disengage the gear of the non-driveshaft Input2 (306 and 307). The first pressure is a clutch pressure corresponding to a take-off point (TOP). Take-off point (TOP) refers to a time at which the non-driveshaft clutch CL2 overcomes the reaction force of the second spring S2 and starts to be compressed.

When the gear of the non-driveshaft Input2 is disengaged, the rotation speed of the non-driveshaft Input2 changes. The control unit 20 determines a first rotation speed change rate of the non-driveshaft Input2 (308), and releases the clutch pressure applied to the non-driveshaft clutch CL2 (309). The control unit 20 may determine a drag torque on the basis of the first rotation speed change rate of the non-driveshaft Input2 (310).

Referring to FIG. 4, after the determining of the drag torque, the control unit 20 may re-engage the gear of the non-driveshaft Input2 (401). The gear of the non-driveshaft Input2 may be engaged in the same gear stage as that in the operation 305.

The control unit 20 may apply a second pressure to the non-driveshaft clutch CL2 and disengage the gear of the non-driveshaft Input2 (402 and 403). The second pressure is a clutch pressure corresponding to a torque touch point (TTP). The torque touch point refers to a time point at which the non-driveshaft clutch CL2 starts to transmit a torque of the engine to the non-driveshaft Input2. The torque touch point may be referred to as a touch point.

The control unit 20 determines a second rotation speed change rate of the non-driveshaft Input2 (404), and releases the clutch pressure applied to the non-driveshaft clutch CL2 (405). The control unit 20 may determine the touch point torque on the basis of the second rotation speed change rate of the non-driveshaft Input2 (406).

The control unit 20 may determine a net torque which is a difference between the touch point torque and the drag torque (407), and adjust the touch point of the non-driveshaft clutch CL2 on the basis of the net torque (408). The control unit 20 may perform gear shift on the basis of the adjusted touch point.

Accordingly, the rotation speed of the engine is separated from the rotation speed of the non-driveshaft through gear engagement and disengagement of the non-driveshaft, so that the influence of the rotation of the engine on the non-driveshaft may be minimized. Furthermore, since g the touch point is adjusted on the basis of the net torque, the shift quality may be improved. Hereinafter, a method of controlling a dual clutch transmission according to an exemplary embodiment will be described in detail with reference to FIGS. 5 to 8. The method of controlling the dual clutch transmission may be referred to as a method of learning a touch point of a dual clutch.

Figure 5:
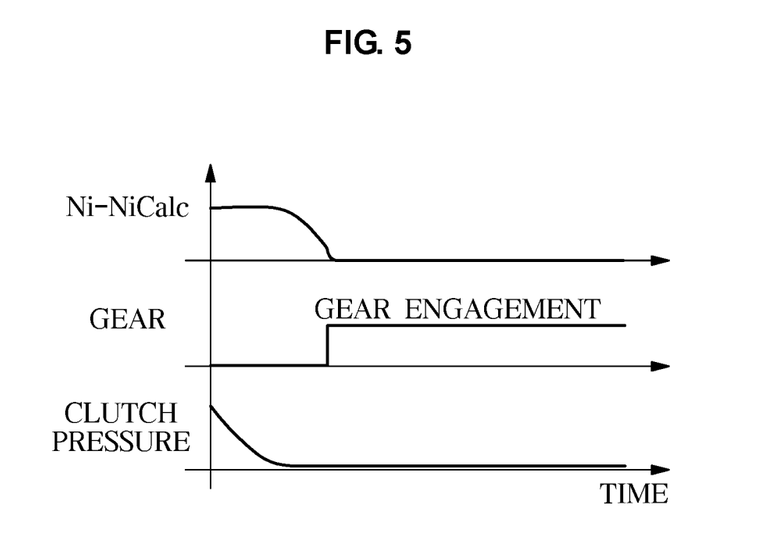
FIG. 5 is a graph for describing a change in rotation speed of a non-driveshaft according to gear engagement of the non-driveshaft.
Figure 6:
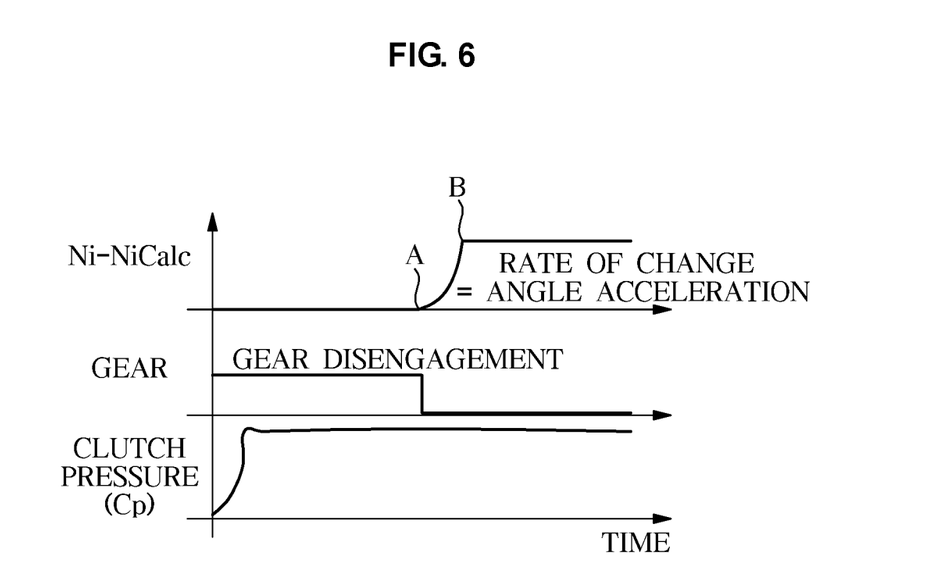
FIG. 6 is a graph for describing a change in rotation speed of a non-driveshaft according to gear disengagement of the non-driveshaft.
Figure 7:
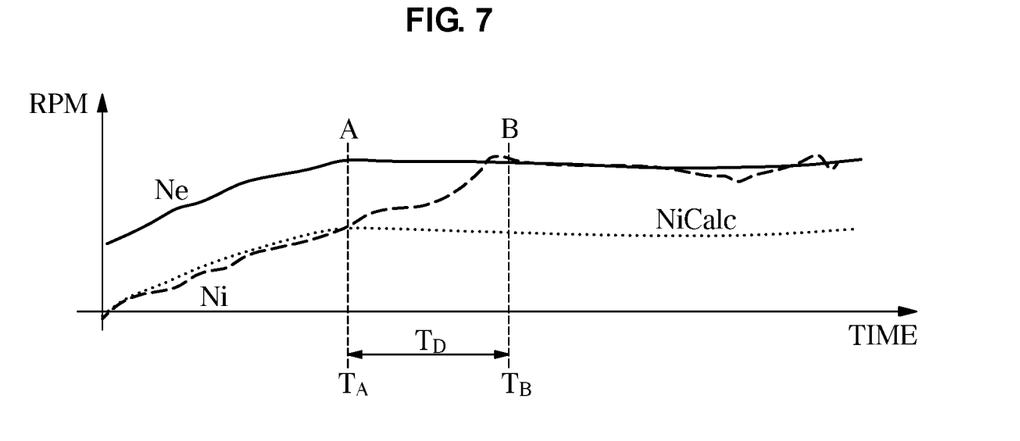
FIG. 7 is a graph for describing a method of determining a rotation speed change rate of a non-driveshaft according to gear disengagement of the non-driveshaft.

FIG. 5 is a graph for describing a change in rotation speed of a non-driveshaft according to gear engagement of the non-driveshaft, FIG. 6 is a graph for describing a change in rotation speed of a non-driveshaft according to gear disengagement of the non-driveshaft, and FIG. 7 is a graph for describing a method of determining a rotation speed change rate of a non-driveshaft according to gear disengagement of the non-driveshaft.

Referring to FIG. 5, Ni denotes the rotation speed of the non-driveshaft Input2 and NiCalc denotes the rotation speed of the non-driveshaft Input2 on which a gear ratio is reflected. The rotation speed may be defined as revolutions per minute (RPM). The rotation speed of the non-driveshaft Input2 on which the gear ratio is reflected refers to the rotation speed of the non-driveshaft Input2 with a specific gear stage engaged, and represents a predetermined virtual rotation speed value.

When the gear of the non-driveshaft (Input2) is engaged, Ni and NiCalc are the same, so that the value of Ni minus Input2 converges to zero. That is, the rotation of the non-driveshaft Input2 may be restrained by engaging the gear of the non-driveshaft Input2.

Referring to FIG. 6, when a specific clutch pressure is applied to the non-driveshaft clutch CL2 and the gear of the non-driveshaft Input2 is disengaged, a torque corresponding to the specific clutch pressure is transmitted to the non-driveshaft Input2. Accordingly, the rotation speed of the non-driveshaft Input2 is subject to change. FIG. 6 shows that the rotation speed of the non-driveshaft Input2 increases from the point of time at which the gear of the non-driveshaft Input2 is disengaged.

The torque transmitted to the non-driveshaft Input2 may be determined using a change rate of the rotation speed of the non-driveshaft Input2. The rotation angle acceleration of the non-driveshaft Input2 may be determined from the change rate of the rotation speed of the non-driveshaft Input2, and the torque transmitted to the non-driveshaft Input2 may be determined by substituting the rotation angle acceleration of the non-driveshaft Input2 for Equation 1 below.

$$Tcl1 = J1*a1 + c1*w1 - d1 \qquad \text{[Equation 1]}$$

Here, a1 is the rotation angle acceleration of the non-driveshaft Input2, and c1*w1 and d1 are values corresponding to the transmission loss, ignorable when determining a torque.

Accordingly, the control unit 20 may determine a torque transmitted to the non-driveshaft Input2 in a response to a specific clutch pressure applied to the non-driveshaft clutch CL2.

On the other hand, in FIG. 6 and FIG. 7, point A refers to a slip initial time point, and point B refers to a slip ending time point. The slip initial time point A (TA) may be set using a difference between the rotation speed Ni of the non-driveshaft and the predetermined virtual rotation speed NiCalc. That is, the slip initial time point A (TA) may be set to a time point at which a difference between the rotation speed Ni of the non-driveshaft Input2 and the predetermined virtual rotation speed NiCalc occurs.

The slip ending time point B (TB) may be set using a difference between the rotation speed Ne of the engine and the rotation speed Ni of the non-driveshaft. That is, the slip ending time point B (TB) may be set to a time point at which the rotation speed Ne of the engine is synchronized with the rotation speed Ni of the non-driveshaft.

The control unit 20 determines the time difference between the slip initial time point A (TA) and the slip ending time point B (TB) as a slip time TD, and determines the change rate in the rotation speed of the non-driveshaft Input2 using a change value of the rotation speed of the non-driveshaft Input2 during the slip time.

Figure 8:
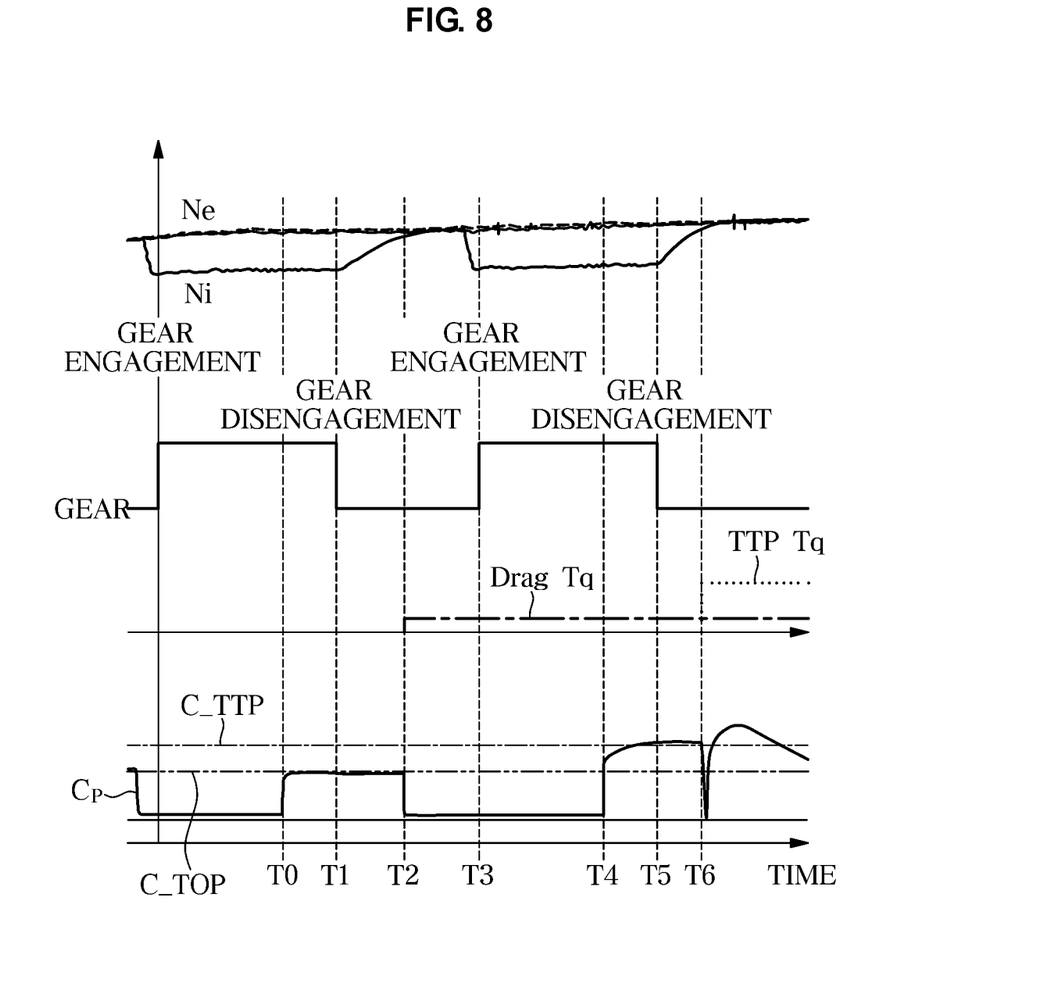
FIG. 8 is a graph for describing a method of controlling a dual clutch transmission according to an exemplary embodiment of the present invention.

FIG. 8 is a graph for describing a method of controlling a dual clutch transmission according to an exemplary embodiment of the present invention.

Referring to FIG. 8, the control unit 20 determines whether the traveling speed of the vehicle is kept constant, and releases the pressure of the non-driveshaft clutch CL2 when the traveling speed of the vehicle is kept constant. Thereafter, the control unit 20 engages the gear of the non-driveshaft Input2. In the instant case, the control unit 20 may increase the gear stage of the non-driveshaft Input2 by one stage and then engage the gear of the non-driveshaft Input2. For example, when the gear of the non-driveshaft Input2 is currently in the second stage, the control unit 20 may engage the gear in the third stage.

The control unit 20 may apply a first pressure C_TOP to the non-driveshaft clutch CL2 (T0) and disengage the gear of the non-driveshaft Input2 (T1). The first pressure C_TOP is a clutch pressure corresponding to the take-off point (TOP). Take-off point refers to a time point at which the non-driveshaft clutch CL2 overcomes the reaction force of the second spring S2 and starts to be compressed. In the TOP, the non-driveshaft is considered to be in freewheeling state due to the clearance of the non-driveshaft clutch CL2. Accordingly, the first pressure C_TOP applied to the non-driveshaft clutch CL2 is associated with a drag torque. Meanwhile, the first pressure C_TOP is a predetermined value.

When the gear of the non-driveshaft Input2 is disengaged (T1), the rotation speed of the non-driveshaft Input2 is subject to change. The control unit 20 releases the clutch pressure applied to the non-driveshaft clutch CL2 (T2), and determines a first slip time T2–T1 of the non-driveshaft Input2. The control unit 20 determines a first rotation speed change rate on the basis of a change value of the rotation speed of the non-driveshaft Input2 during the first slip time T2–T1. The control unit 20 may determine a drag torque Drag Tq on the basis of the first rotation speed change rate of the non-driveshaft Input2.

The control unit 20, after the determination of the drag torque, re-engages the gear of the non-driveshaft Input2 (T3). The gear of the non-driveshaft input 2 may be engaged in the same gear stage as that in the determination of the drag torque.

The control unit 20 applies a second pressure C_TTP to the non-driveshaft clutch CL2 (T4), and disengages the gear of the non-driveshaft Input2 (T5). The second pressure is a clutch pressure corresponding to a torque touch point (TTP).

The torque touch point refers to a time point at which the non-driveshaft clutch CL2 starts to transmit a torque of the engine to the non-driveshaft Input2. The torque touch point may be referred to as a touch point. Furthermore, the second pressure C_TTP corresponds to a previously learned touch point.

When the gear of the non-driveshaft Input2 is disengaged (T5), the rotation speed of the non-driveshaft Input2 is subject to change. The control unit 20 releases the clutch pressure applied to the non-driveshaft clutch CL2 (T6), and determines a second slip time T6–T5 of the non-driveshaft Cl2. The control unit 20 determines a second rotation speed change rate on the basis of a change value of the rotation speed of the non-driveshaft Input2 during the second slip time T6–T5. The control unit 20 may determine the touch point torque TTP Tq on the basis of the second rotation speed change rate of the non-driveshaft Input2.

Thereafter, the control unit 20 may determine a net torque which is a difference value between the touch point torque and the drag torque, and adjust the touch point of the non-driveshaft clutch CL2 on the basis of the net torque.

The control unit 20 may determine, when the net torque is greater than or equal to a predetermined reference torque, a compensation pressure value on the basis of a difference between the net torque and the reference torque. The control unit 20 may adjust a pressure value obtained by reducing the second pressure by the compensation pressure value, as the touch point of the non-driveshaft clutch CL2.

Furthermore, the control unit 20 may determine, when the net torque is less than a predetermined reference torque, a compensation pressure value on the basis of a difference between the net torque and the reference torque, and may adjust a pressure value obtained by increasing the second pressure by the compensation pressure value, as the touch point of the non-driveshaft clutch CL2. In other words, the control unit 20 may update the second pressure value. The control unit 20 may perform gear shift on the basis of the adjusted touch point.

As described above, the included method and system for controlling the dual clutch transmission may accurately learn the touch point of the clutch even with a dag torque of a wet clutch and reflect the touch point on the gear shift, so that the shift quality and drivability may be improved.

Furthermore, the included method and system for controlling the dual clutch transmission may accurately learn a touch point, so that the accuracy of the clutch torque control may be improved.

Meanwhile, the disclosed exemplary embodiments may be embodied in a form of a recording medium storing instructions executable by a computer. The instructions may be stored in a form of program code and, when executed by a processor, may generate a program module to perform the operations of the included exemplary embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, the method of controlling the dual clutch transmission and the system thereof can improve the shift quality and the drivability by accurately learning the touch point of the clutch even with a dag torque of a wet clutch, and reflecting the tough point on the gear shift.

Furthermore, the method of controlling the dual clutch transmission and the system thereof can improve the accuracy of clutch torque control by accurately learning the touch point.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling a dual clutch transmission, the method comprising:
   releasing, by a controller, a pressure of a non-driveshaft clutch and engaging a gear of a non-driveshaft connected to the non-driveshaft clutch by the non-driveshaft;
   applying, by the controller, a first pressure to the non-driveshaft clutch and disengaging the gear of the non-driveshaft based on a rotation speed of the non-driveshaft detected by a rotation speed sensor;
   determining, by the controller, a drag torque on a basis of a first rotation speed change rate of the non-driveshaft;
   releasing, by the controller, the first pressure and engaging the gear of the non-driveshaft;
   applying, by the controller, a second pressure to the non-driveshaft clutch and disengaging the gear of the non-driveshaft;
   determining, by the controller, a touch point torque on a basis of a second rotation speed change rate of the non-driveshaft based on the rotation speed of the non-driveshaft detected by the rotation speed sensor; and
   adjusting, by the controller, a touch point of the non-driveshaft clutch on a basis of a net torque which is a difference between the touch point torque and the drag torque.

2. The method of claim 1, further including:
   detecting a travelling speed of a vehicle by a vehicle speed sensor,
   wherein the releasing of the pressure of the non-driveshaft clutch and engaging of the gear of the non-driveshaft is performed upon determining that the travelling speed of the vehicle is kept constant.

3. The method of claim 1, wherein the determining of the drag torque on the basis of the first rotation speed change rate of the non-driveshaft includes:
   determining a first slip time of the non-driveshaft; and
   determining the first rotation speed change rate on a basis of a change value of a rotation speed of the non-driveshaft during the first slip time.

4. The method of claim 3, wherein the determining of the first slip time of the non-driveshaft includes:
   setting a slip starting time point using a difference between the rotation speed of the non-driveshaft and a predetermined virtual rotation speed;
   setting a slip ending time point using a difference between a rotation speed of an engine and the rotation speed of the non-driveshaft; and
   determining a difference between the slip starting time point and the slip ending time point as the first slip time.

5. The method of claim 1, wherein the determining of the touch point torque on the basis of the second rotation speed change rate of the non-driveshaft includes:
   determining a second slip time of the non-driveshaft; and
   determining the second rotation speed change rate on a basis of a change value of a rotation speed of the non-driveshaft during the second slip time.

6. The method of claim 5, wherein the determining of the second slip time of the non-driveshaft includes:
   setting a slip starting time point using a difference between the rotation speed of the non-driveshaft and a predetermined virtual rotation speed;
   setting a slip ending time point using a difference between a rotation speed of an engine and the rotation speed of the non-driveshaft; and
   determining a difference between the slip starting time point and the slip ending time point as the second slip time.

7. The method of claim 1, wherein the adjusting of the touch point of the non-driveshaft clutch on the basis of the net torque includes:
   determining, upon determining that the net torque is greater than or equal to a predetermined reference torque, a compensation pressure value on a basis of a difference between the net torque and the predetermined reference torque; and
   adjusting a pressure value obtained by reducing the second pressure by the compensation pressure value, as the touch point of the non-driveshaft clutch.

8. The method of claim 1, wherein the adjusting of the touch point of the non-driveshaft clutch on the basis of the net torque includes:
   determining, upon determining that the net torque is less than a predetermined reference torque, a compensation pressure value on a basis of a difference between the net torque and the predetermined reference torque; and
   adjusting a pressure value obtained by increasing the second pressure by the compensation pressure value, as the touch point of the non-driveshaft clutch.

9. The method of claim 1, further including performing a gear shift on a basis of the adjusted touch point.

10. A system of controlling a dual clutch transmission, the system comprising:
- a dual clutch module including a driveshaft clutch selectively connecting an engine to a driveshaft, a non-driveshaft clutch selectively connecting the engine to a non-driveshaft, a driveshaft clutch actuator, a non-driveshaft clutch actuator, a gear of a non-driveshaft connected to the non-driveshaft clutch by the non-driveshaft, and a gear of the driveshaft connected to the driveshaft clutch by the driveshaft;
- an input shaft rotation speed sensor configured to measure a rotation speed of the driveshaft and a rotation speed of the non-driveshaft;
- a clutch pressure sensor configured to measure a pressure applied to the driveshaft clutch and a pressure applied to the non-driveshaft clutch; and
- a control unit including a processor and a memory,
- wherein the control unit is configured to:
  - release a pressure of the non-driveshaft clutch and engage the gear of the non-driveshaft;
  - apply a first pressure to the non-driveshaft clutch and disengage the gear of the non-driveshaft;
  - determine a drag torque on a basis of a first rotation speed change rate of the non-driveshaft based on the rotation speed of the non-driveshaft detected by the input shaft rotation speed sensor;
  - release the first pressure and engage the gear of the non-driveshaft;
  - apply a second pressure to the non-driveshaft clutch and disengage the gear of the non-driveshaft;
  - determine a touch point torque on a basis of a second rotation speed change rate of the non-driveshaft based on the rotation speed of the non-driveshaft detected by the input shaft rotation speed sensor; and
  - adjust a touch point of the non-driveshaft clutch on a basis of a net torque which is a difference between the touch point torque and the drag torque.

11. The system of claim 10, further including a vehicle speed sensor configured to detect a travelling speed of a vehicle,
- wherein the control unit is configured to release the pressure of the non-driveshaft clutch and to engage the gear of the non-driveshaft when the travelling speed of the vehicle detected by the vehicle speed sensor is kept constant.

12. The system of claim 10, wherein the control unit is configured to:
- determine a first slip time of the non-driveshaft; and
- determine the first rotation speed change rate on a basis of a change value of a rotation speed of the non-driveshaft detected by the input shaft rotation speed sensor during the first slip time.

13. The system of claim 12, wherein the control unit is configured to:
- set a slip starting time point using a difference between the rotation speed of the non-driveshaft detected by the input shaft rotation speed sensor and a predetermined virtual rotation speed;
- set a slip ending time point using a difference between a rotation speed of the engine and the rotation speed of the non-driveshaft; and
- determine a difference between the slip starting time point and the slip ending time point as the first slip time.

14. The system of claim 10, wherein the control unit is configured to:
- determine a second slip time of the non-driveshaft; and
- determine the second rotation speed change rate on a basis of a change value of the rotation speed of the non-driveshaft detected by the input shaft rotation speed sensor during the second slip time.

15. The system of claim 14, wherein the control unit is configured to:
- set a slip starting time point using a difference between the rotation speed of the non-driveshaft detected by the input shaft rotation speed sensor and a predetermined virtual rotation speed;
- set a slip ending time point using a difference between a rotation speed of the engine and the rotation speed of the non-driveshaft detected by the input shaft rotation speed sensor; and
- determine a difference between the slip starting time point and the slip ending time point as the second slip time.

16. The system of claim 10, wherein the control unit is configured to:
- determine, upon determining that the net torque is greater than or equal to a predetermined reference torque, a compensation pressure value on a basis of a difference between the net torque and the predetermined reference torque; and
- adjust a pressure value obtained by reducing the second pressure by the compensation pressure value, as the touch point of the non-driveshaft clutch.

17. The system of claim 10, wherein the control unit is configured to:
- determine, upon determining that the net torque is less than a predetermined reference torque, a compensation pressure value on a basis of a difference between the net torque and the predetermined reference torque; and
- adjust a pressure value obtained by increasing the second pressure by the compensation pressure value, as the touch point of the non-driveshaft clutch.

18. The system of claim 10, wherein the control unit is configured to perform a gear shift on a basis of the adjusted touch point.

* * * * *